Oct. 29, 1946. H. E. MACHAMER 2,410,175
JOINT
Filed Oct. 22, 1943
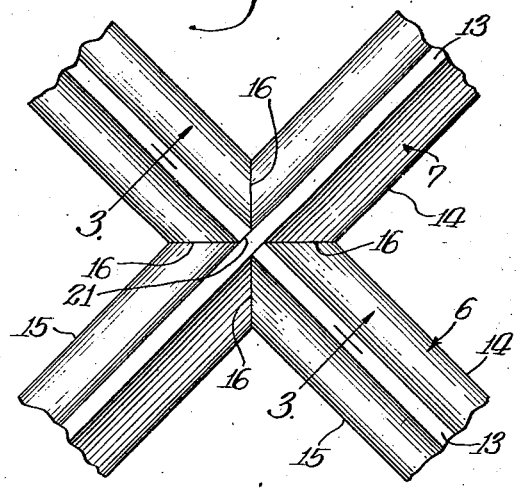
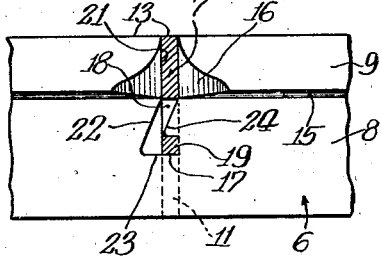
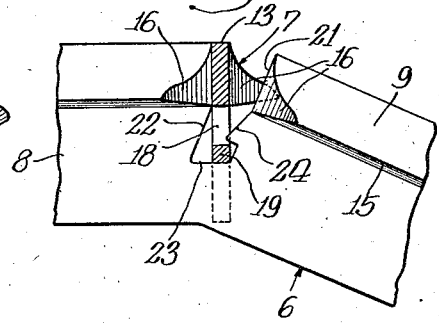
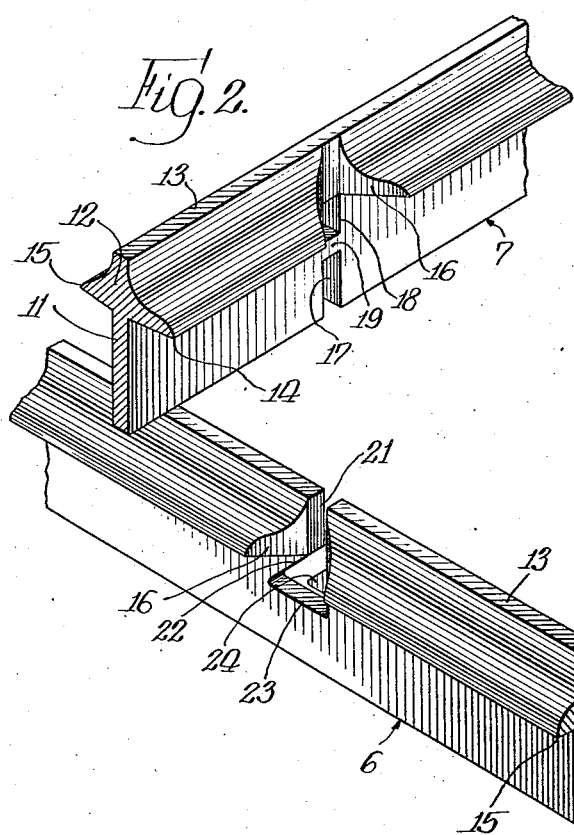
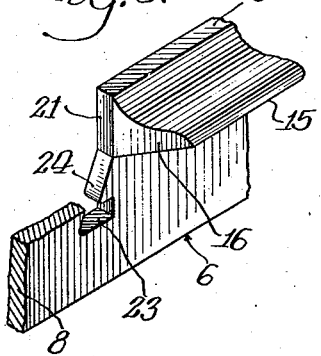
INVENTOR.
Hobart E. Machamer,
BY
Chas. J. Wilson
Atty.

Patented Oct. 29, 1946

2,410,175

UNITED STATES PATENT OFFICE 2,410,175

JOINT

Hobart E. Machamer, Oak Park, Ill., assignor to Ceco Steel Products Corporation, Omaha, Nebr., a corporation of Nebraska Application October 22, 1943, Serial No. 507,313

3 Claims. (Cl. 287—51)

This invention pertains to metal joints by which a pair of crossed or intersecting members are united. While members of various kinds may be connected by joints of this character, my invention is here shown for illustrative purposes as embodied in a muntin joint.

In the joining of muntins, as well as other frame construction members, it is desirable that the members be rigidly connected together so as to form a strong, durable joint, but at the same time it is desirable that the joint be effected without the necessity of welding the members together.

My present invention is designed to meet these requirements and aims to provide a joint between intersecting muntins or the like which will be strong, rigid and durable and which can be assembled without the necessity of welding the parts together.

As illustrating the principles of my invention, I have shown on the accompanying drawing a preferred embodiment thereof, referring to which, Fig. 1 is a plan view of a joint constructed in accordance with my invention;

Fig. 2 is an exploded perspective view of the two muntin members as formed preparatory to being joined;

Fig. 3 is a sectional view on the line 3—3 of Fig. 1;

Fig. 4 is a view similar to Fig. 3 showing the lower member bent to widen the slot for the reception of the upper member; and Fig. 5 is a fragmentary view of the lower member, a portion thereof being broken away.

Referring to the drawing more in detail, reference characters 6 and 7 designate respectively the muntin members embodied in the joint of my invention. The member 6 comprises a web portion 8 and a head 9, and the member 7 which is of similar construction comprises the web portion 11 and the head 12. The cross-sectional shape of the muntin head portions may vary in accordance with the manufacturer's choice, but as here shown comprises an upper edge of substantially the thickness of the web 8 and laterally projecting flanges 14 and 15 which, together with the web 8, form in rough outline a T-bar.

The first step in fabricating the members to produce the joint is to cut out and remove a section of each of the flanges 14 and 15 at the point in the members where the joint is to be made. The flanges are cut at an angle, preferably of 45°, so that when the members are joined together adjacent flanges will abut along the lines 16 (Fig. 1) so as to hold the joined members at right angles to each other.

For purposes of clarity in description the muntin member 6 will be referred to as the lower member and the member 7 as the upper member. This description, however, is only for convenience, as it will be appreciated that the joints when in use may be disposed in any position, and usually in window constructions the showing of the joint in Fig. 1 would be viewed as a side elevation.

After the flanges have been notched out, as previously described, the web 11 of the member 7 is provided with a slot 17 extending from the lower edge upwardly or inwardly for a limited distance and with a recess 18 formed by an opening extending through the web in alignment with but spaced from the slot 17 so as to leave an intervening locking bar 19 between the slot and the recess.

The other member 6 is slotted from its upper edge 13 downwardly at the notched portions of the flanges 14, 15 to provide a vertical slot portion 21 which extends to the base of the head 9. Beneath this vertical slot portion and spaced therefrom a distance substantially equal to the depth of the recess 18 in the other member, is formed a recess 23 extending longitudinally of the member 6 and proportioned to receive the locking bar 18. The lower end of the slot portion 21 is connected with the recess 23 by a slot portion 22, a part at least of which extends at an angle to the portion 21 so as to outline an undercut locking lug 24 disposed between the recess 23 and the vertical portion 21 of the slot. After the slot consisting of portions 21 and 22 and the recess 23 have been formed in the member 6, as explained, the slot is widened by bending the web 8 as shown in Fig. 4, so that the locking bar 19 of the member 7 may be introduced through the slot into the recess 23 beneath the locking lug 24. When the parts have been thus assembled, the bar 6 is straightened back to its original position, thereby projecting the locking lug 24 into the recess 18 of member 7 so that the two members become firmly locked together with the locking bar 19 beneath the locking lug 24, as shown in Fig. 3.

In this manner, without the employment of welding, the two members are securely locked together against separation one from the other and against angular movement of one with respect to the other. The resulting union is a rigid, strong and durable joint which can be economically produced, since it involves only simple cutting and piercing operations upon the members to be joined followed by a bending and restraightening of one of the members.

The order of procedure, the proportions and other details illustrated and described may be varied within considerable limits without exceeding the scope of the invention as defined in the following claims.

I claim:

1. A joint consisting of a plurality of intersecting members each comprising a web portion and a flanged head portion, the flanges of said head portions being notched to effect interfitting engagement, one of said members being provided with a slot, a recess and an interposed locking bar, the other of said members being provided with a transverse slot, a longitudinal recess and an angular slot joining said transverse slot and said recess, the slots and recess outlining a locking lug disposed in alignment with the transverse slot, said locking bar of one member being disposed in the recess of the other member and the locking lug of the other member being disposed in the recess of the one member.

2. A muntin joint structure, comprising a pair of crossed interlocking bars each consisting of a web and a head extending along one edge of the web, each head being provided with oppositely disposed notches complemental to the notches of the other head, the web of one of said bars being provided with a slot extending upwardly from the lower edge thereof, a recess above the slot and below the head and a locking bar disposed between said slot and recess, and the other bar having a slot extending downwardly from the upper edge of the head between the oppositely disposed notches therein, a longitudinally extending recess disposed below and in alignment with said slot, and a locking lug interposed between said slot and recess, said locking bar and locking lug being each located in the assembled structure in the recess of the other bar.

3. A joint consisting of a plurality of crossed interlocking members, one of said members having a vertical slot extending upwardly from the lower edge thereof, a recess aligned with said slot and spaced from the inner end thereof and a locking bar disposed between said slot and recess, the other of said members having a vertical slot extending downwardly from the upper edge thereof and an elongated recess extending longitudinally of said member in alignment with said vertical slot and a locking lug disposed between said slot and said recess, said lug being outlined by an angular continuation of said slot connecting the lower end of said slot with one end of said recess, the locking bar and the lug of the respective members being each located in the recess of the other member.

HOBART E. MACHAMER.